(12) United States Patent
Dawson et al.

(10) Patent No.: US 10,783,681 B2
(45) Date of Patent: Sep. 22, 2020

(54) ARTIFICIALLY TILTABLE IMAGE DISPLAY

(71) Applicant: International Business Machines Corporation, Armonk, NY (US)

(72) Inventors: Alan B. Dawson, Eastleigh (GB); James P. Hodgson, Basingstoke (GB); Gordon D. Hutchison, Eastleigh (GB); Matthew B. White, Bishop's Waltham (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/703,440

(22) Filed: Sep. 13, 2017

(65) Prior Publication Data

US 2019/0080493 A1  Mar. 14, 2019

(51) Int. Cl.
*G06T 15/20* (2011.01)
*G06T 11/60* (2006.01)
*G06F 3/0484* (2013.01)
*G06F 3/0481* (2013.01)
*G06F 3/01* (2006.01)

(52) U.S. Cl.
CPC .............. *G06T 11/60* (2013.01); *G06F 3/017* (2013.01); *G06F 3/04815* (2013.01); *G06F 3/04845* (2013.01); *G06F 2200/1637* (2013.01)

(58) Field of Classification Search
CPC ....................................................... G06T 11/60
See application file for complete search history.

(56) References Cited

U.S. PATENT DOCUMENTS

| | | | |
|---|---|---|---|
| 7,113,183 B1* | 9/2006 | Collins | G06T 15/405 345/419 |
| 8,044,997 B2* | 10/2011 | Masuda | H04N 13/128 348/51 |
| 8,599,198 B2 | 12/2013 | Yamada | |
| 8,913,056 B2 | 12/2014 | Zimmer et al. | |
| 9,007,404 B2 | 4/2015 | DeJohn et al. | |
| 9,448,694 B2* | 9/2016 | Sharma | G06F 3/0486 |
| 2006/0061569 A1 | 3/2006 | Yamada | |
| 2010/0253679 A1* | 10/2010 | Vyakhirev | G06F 3/011 345/419 |
| 2012/0036433 A1 | 2/2012 | Zimmer et al. | |
| 2012/0140027 A1 | 6/2012 | Curtis et al. | |
| 2012/0218303 A1* | 8/2012 | Nakada | G02B 27/017 345/649 |

(Continued)

OTHER PUBLICATIONS

Larson et al., "Z-Stacking of Single Plane Digital Widefield Fluorescent Images," Application Note: Cell Imaging, Fluorescence Microscopy, 3D Cell Culture, Oct. 31, 2014, pp. 1-6, BioTek Instruments, Inc.

(Continued)

*Primary Examiner* — Samantha (Yuehan) Wang
(74) *Attorney, Agent, or Firm* — Nathan M. Rau

(57) ABSTRACT

A computer-implemented method of creating an artificially tiltable image display from an image containing Z distance values, the method comprising: separating the image into a plurality of layers using the Z distance values; expanding the plurality of layers by a factor dependent on the Z distance values, a layer closer to a viewer being enlarged by a larger factor than a layer further from a viewer, to create information in the layer further from a viewer that is occluded by the layer closer to a viewer; and responsive to a request to tilt the image display, moving the plurality of layers relative to each other so as to display the occluded information.

20 Claims, 7 Drawing Sheets

(56) References Cited

U.S. PATENT DOCUMENTS

| | | | |
|---|---|---|---|
| 2013/0162634 A1* | 6/2013 | Baik | H04N 13/122 |
| | | | 345/419 |
| 2015/0085076 A1* | 3/2015 | Lockhart | G06F 3/048 |
| | | | 348/46 |
| 2016/0048211 A1* | 2/2016 | Raffle | G06F 3/14 |
| | | | 715/863 |
| 2016/0170604 A1 | 6/2016 | Fields et al. | |
| 2017/0018055 A1 | 1/2017 | Holzer et al. | |
| 2018/0033176 A1 | 2/2018 | Su et al. | |

OTHER PUBLICATIONS

Clover, J., "Apple Acquires Israeli Camera Tech Company LinX Imaging for ~$20 Million," MacRumors, Apr. 14, 2015, pp. 1-10, https://www.macrumors.com/2015/04/14/apple-acquires-linx-imaging/.

Cooper, S., "The Creative Benefits of Light Field," Lytro Blog, Apr. 2016, pp. 1-9, http://blog.lytro.com/the-creative-benefits-of-light-field/.

Haciomeroglu, I., "2.5D Effect | 3D Using After Effects and Photoshop | 4K Wedding Photography," YouTube video, Feb. 26, 2015, pp. 1-3, https://www.youtube.com/watch?v=7Shs6EL0sTw.

Easton, R., "Huawei P9 review—the ultimate dual-lens camera?" p. 1 of 2, Expert Reviews, May 6, 2016, pp. 1-11, retrived Aug. 3, 2017 from https://web.archive.org/web/20160520005436/http://www.expertreviews.co.uk/mobile-phones/1404578/huawei-p9-review-the-ultimate-dual-lens-camera.

"The Parallax Effect: Bringing still images to pseudo-life," MetaFilter community weblog, Jan. 20, 2014, pp. 1-7, http://www.metafilter.com/135845/The-Parallax-Effect-Bringing-still-images-to-pseudo-life.

Molitch-Hou, M., "Apple Acquires LinX to Bring 3D Scanning to its Devices," 3D Printing Industry News, Apr. 24, 2015, pp. 1-2, https://3dprintingindustry.com/news/apple-acquires-linx-to-bring-3d-scanning-to-its-devices-47555/.

"Advanced 2.5D Animation in AE," YouTube video, Mar. 8, 2012, pp. 1-3, https://www.youtube.com/watch?v=RLFnjkSjijl.

"Animated 3D Stereo Photography," Photography Tutorials, printed: Aug. 3, 2017, pp. 1-9, http://www.cambridgeincolour.com/tutorials/animated-3d-stereo-photography.htm.

"We Let Everyone Capture Reality in 3D," Seene.co, printed Sep. 12, 2017, pp. 1-2. https://seene.co/.

Dawson et al., "Artificially Tiltable Image Display," U.S. Appl. No. 16/543,986, filed Aug. 19, 2019.

List of IBM Patents or Patent Applications Treated as Related, Signed Aug. 19, 2019, 2 pages.

* cited by examiner

ARTIFICIALLY TILTABLE IMAGE DISPLAY

BACKGROUND

The present disclosure relates to an artificially tiltable image display, and more specifically to the creation of an artificially tiltable image display from an image containing Z distance information.

A portable device with a multiple aperture camera is able to capture Z distance information. The use of multiple apertures, typically a few centimeters apart, can be used, via parallax, to create a Z, or distance, value for pixels in the image. Because each of the apertures has a slightly different view of the scene creating the image, it is possible to determine how far away from the aperture objects in the scene are. If an object is a long way away, in the background, then the few centimeter spacing between the apertures is irrelevant and the same view is seen from each of the apertures. If an object is close to the multiple apertures, in the foreground, then the spacing between the apertures means that the view from each of the apertures may differ significantly. Similarly, if an object is between the background and foreground, that is in the midground, then the view from each of the apertures may differ, but less than for an object in the foreground. This allows the creation of a Z value for each area of the scene.

It is possible to combine together a first 2D image and a second 2D image component, such as a button on a display, that is displayed as if it is on a different 'plane' that is artificially made to appear to be positioned, for example, 1 cm, 'above' the underlying first 2D image. This may be achieved by providing a relative shift between the two images as the display, such as on a mobile device, is tilted, the relative shift being so as to give the impression that the buttons are floating 1 cm above the first background 2D image.

SUMMARY

According to an embodiment of the disclosure, a computer-implemented method of creating an artificially tiltable image display from an image containing Z distance values, the method comprising: separating the image into a plurality of layers using the Z distance values; expanding the plurality of layers by a factor dependent on the Z distance values, a layer closer to a viewer being enlarged by a larger factor than a layer further from a viewer, to create information in the layer further from a viewer that is occluded by the layer closer to a viewer; and responsive to a request to tilt the image display, moving the plurality of layers relative to each other so as to display the occluded information.

Embodiments of the disclosure provide an apparatus for creating an artificially tiltable image display from an image containing Z distance values, the apparatus comprising: an image layer separator module for separating the image into a plurality of layers using the Z distance values; an image layer enlargement module for expanding the plurality of layers by a factor dependent on the Z distance values, a layer closer to a viewer being enlarged by a larger factor than a layer further from a viewer, to create information in the layer further from a viewer that is occluded by the layer closer to a viewer; and an image layer composition module which, responsive to a request to tilt the image display, moves the plurality of layers relative to each other so as to display the occluded information.

Embodiments of the disclosure also provide a computer program product for creating an artificially tiltable image display from an image containing Z distance values, the computer program product comprising: a computer readable storage medium having program instructions embodied therewith, the program instructions executable by a computer to cause the computer to: separate the image into a plurality of layers using the Z distance values; expand the plurality of layers by a factor dependent on the Z distance values, a layer closer to a viewer being enlarged by a larger factor than a layer further from a viewer, to create information in the layer further from a viewer that is occluded by the layer closer to a viewer; and responsive to a request to tilt the image display, move the plurality of layers relative to each other so as to display the occluded information.

BRIEF DESCRIPTION OF THE DRAWINGS

Preferred embodiments of the present disclosure will now be described in more detail, by way of example only, with reference to the accompanying drawings, in which.

DETAILED DESCRIPTION

Figure 1:
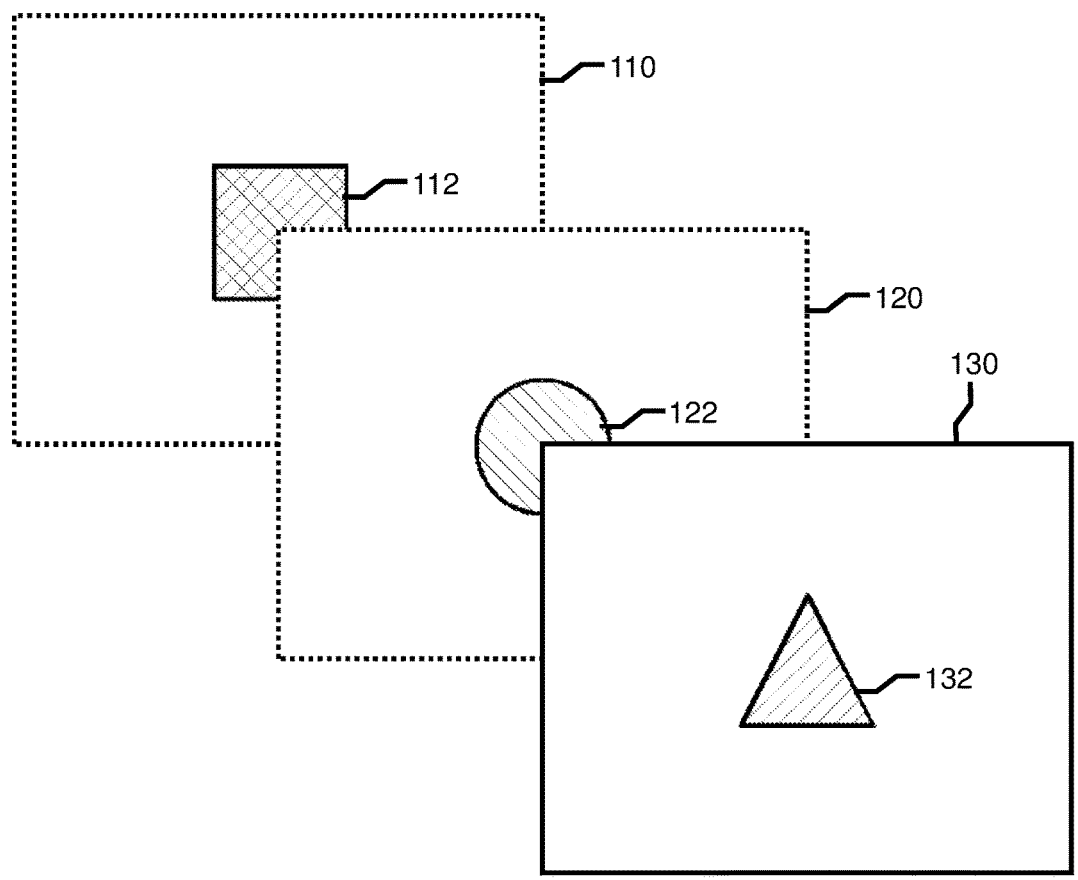
FIG. 1 shows an oblique view of three objects, one object being in each of a foreground, a midground and a background plane.

FIG. 1 shows an oblique view of three objects 112, 122, 132. In the example of FIG. 1, object 112 is a square, object 122 is a circle and object 132 is a triangle, but the choice of these shapes is for exemplary purposes only and embodiments of the present disclosure may use objects 112, 122, 132 of any type and shape. The objects 112, 122, 132 are real physical objects and not objects as are known in the art of structured computer programming. Typically, the objects 112, 122, 132 are items appearing in an image. Object 112 is located in a background plane 110, object 122 is located in a midground plane 120 and object 132 is located in a foreground plane 130. As will be obvious to a person skilled in the art, a foreground plane 130 is closer to an observer than a midground plane 120 and a background plane 110. Similarly, a midground plane 120 is closer to an observer than a background plane 110. Embodiments of the disclosure are not limited to using three objects 112, 122, 132 in three planes 110, 120, 130 and may use two or more planes 110, 120, 130 with at least two objects 112, 122, 132 in total. In particular, two planes 110, 120, 130 may be used when the image content comprises people, where the people are in the midground with a disjoint background and nothing in the foreground. Single or multiple objects 112, 122, 132 in any one of the planes 110, 120, 130 may be used.

Figure 2:
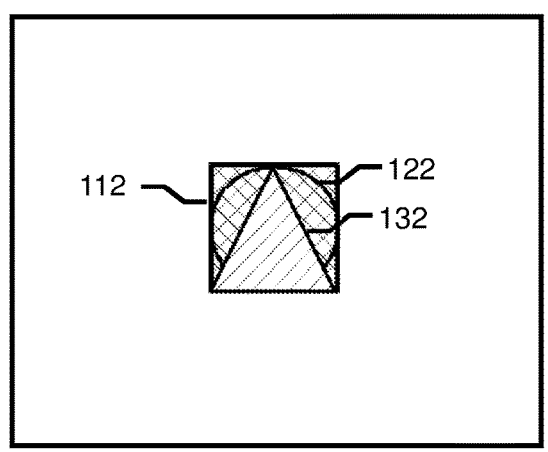
FIG. 2 shows a view from straight ahead of the objects of FIG. 1.

FIG. 2 shows a view from straight ahead of the objects 112, 122, 132 of FIG. 1. Object 132 in a foreground plane 130 obscures portions of objects 122, 112 in the midground 120 and background 110 planes respectively. Similarly, object 122 in the midground plane 120 obscures portions of object 112 in the background plane 110. Although the three objects 112, 122, 132 are shown in FIG. 2 aligned, the use of embodiments of the present disclosures is not limited to objects 112, 122, 132 which are aligned and objects 112, 122, 132 may overlap each other in any combination.

Figure 3:
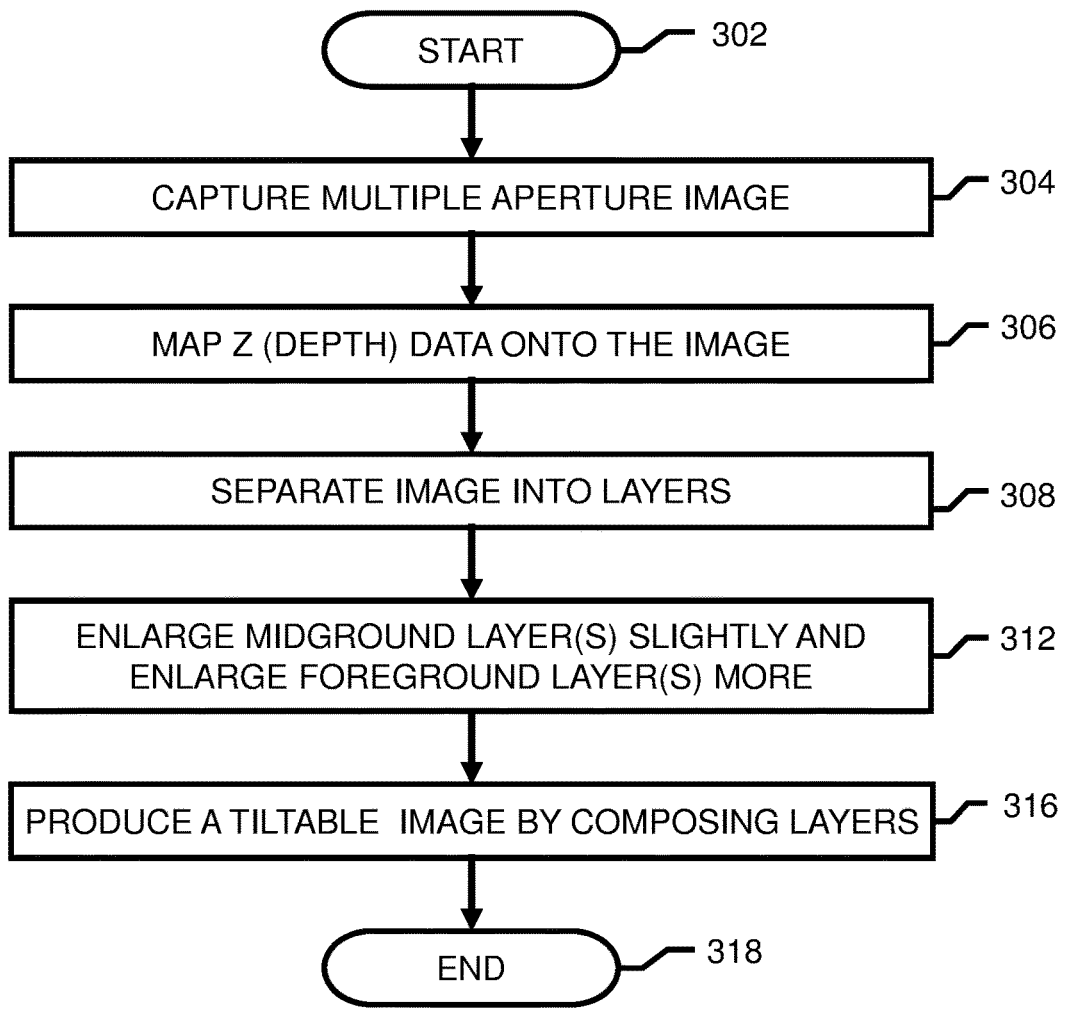
FIG. 3 is a flow chart of a computer-implemented method according to an embodiment of the present disclosure of creating an artificially tiltable image display from an image containing Z distance information.

FIG. 3 is a flow chart of a computer-implemented method according to an embodiment of the present disclosure of creating an artificially tiltable image display from an image containing Z distance information. The method starts at step 302. At step 304, a multiple aperture image is captured. A multiple aperture image may be captured using two image apertures and associated sensors which are spaced apart. The spacing apart of these multiple apertures may be by any amount, but typically is a few centimeters. More than two apertures may be used and spacing other than a few centimeters may be used. At step 306, Z, or depth, data is mapped onto the image. Because the images captured by each of the multiple apertures are taken from slightly different positions, it is possible, using parallax, to obtain a distance of an object from the apertures. For example, an object which is in a background plane 110 will be seen by image sensors associated with each of the apertures as being located in substantially the same position. Similarly, an object which is in a foreground plane 130 will be seen by image sensors associated with each of the apertures as being located in a different position when viewed from each of the apertures. Further, objects in a midground plane 120 will be seen by the image sensors associated with each of the apertures as being located in a position that is somewhere between the foreground and background objects. This difference in perceived position between the views from each aperture may be used to determine the Z (or depth) position of each portion in an image, with each portion typically being an object. Such mapping is well known to persons skilled in the art.

Referring to FIG. 1, object 112 in background plane 110 will appear to be in substantially the same position in each of the multiple aperture images. Object 132 in foreground plane 130 will appear to be in a different position when viewed from each of the multiple apertures. Object 122 in midground plane 120 will also appear to be in a different position when viewed from each of the multiple apertures, but by a smaller amount than object 132 in the foreground plane 130.

Returning to FIG. 3, at step 308, the captured image is separated into layers according to the mapped Z value associated with each portion of the image. In embodiments of the disclosure, the captured image is separated into layers, with each layer containing portions of the image associated with objects have a range of Z distance values. For example, a foreground layer may contain portions of the image associated with objects at a distance of less than 10 arbitrary units from the apertures. Similarly, a midground layer may contains portions of the image associated with objects at a distance of 10 to 30 arbitrary units from the apertures. Further, a background layer may contain portions of the image associated with objects at a distance of more than 30 arbitrary units from the apertures. These distances are provided as examples only and embodiments of the present disclosure may implement any combination of distances, provided that foreground objects are closer to the aperture than background objects. Although embodiments of the disclosure have been described using three layers of foreground, midground and background, other numbers of layers may be used. In particular, two layers may be used when the image content comprises people, where the people are in the midground with a disjoint background and nothing in the foreground.

In another embodiment of the disclosure, the captured image is separated into layers, with each layer containing portions of the image associated with objects having a particular Z value. A midground layer may contain portions of the image associated with objects at a distance of 20 arbitrary units only, with a foreground layer containing portions of the image associated with objects at a distance of less than 20 arbitrary units only and a background layer containing portions of the image associated with objects at a distance of more than 20 arbitrary units only. Further, as described above, any number of layers may be used in embodiments of the disclosure, three layers being described here for clarity of description. Each layer may be associated with any size of range of Z values.

In an embodiment, the range of Z values associated with one of the layers may be adjusted to avoid splitting an object between layers. This is achieved by identifying adjacent areas of the screen, determined by identifying areas that have adjacent X and Y values, which also have adjacent Z values, but which would be in different layers. These identified areas are then placed into the same Z layer. A simplified example will now be described using just two pixels. For example, an area of an image has a pixel at an X co-ordinate of 50 and a Y co-ordinate of 50 which has a mapped Z value of 11 arbitrary units. Using the ranges described above, this area of the image forms part of the midground. Another area of an image has a pixel at an X co-ordinate of 51 and a Y co-ordinate of 51 and has a mapped Z value of 9. Using the ranges described above, this area of the image forms part of the foreground. But, the two pixels are adjacent to each other and the Z values are similar, although falling into separate layers. It is most likely that these two pixels of the image are associated with the same object. So the range of pixels associated with, for example, the midground layer, may be adjusted to be from 9 to 30 arbitrary units, whilst the range associated with the foreground layer is adjusted to be from 0 to 8 arbitrary units.

In another embodiment, instead of adjusting the ranges associated with each of the layers as described above, particular areas of the image may be assigned to, for example, a midground layer, based on the Z values of adjacent pixels indicating that the particular areas of the image, although having different, but similar Z values, are part of the same object. In the example above, the range of pixels associated with, for example, the midground layer, may remain at 10 to 30 arbitrary units and the range associated with the foreground layer may remain at 0 to 10 arbitrary units, but the pixel having an X co-ordinate of 51 and a Y co-ordinate of 51 and a mapped Z value of 9 is nevertheless placed in the midground layer, thus keeping the entirety of an object in the same layer.

Figure 4:
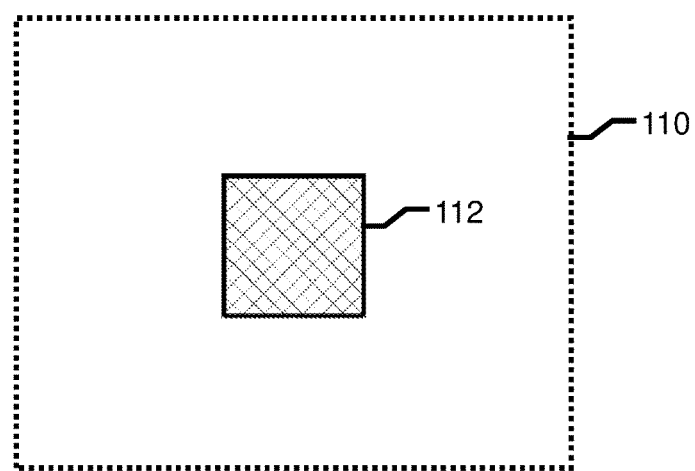
FIG. 4 shows the background plane of FIG. 1, together with the object that is present in the background plane.
Figure 5:
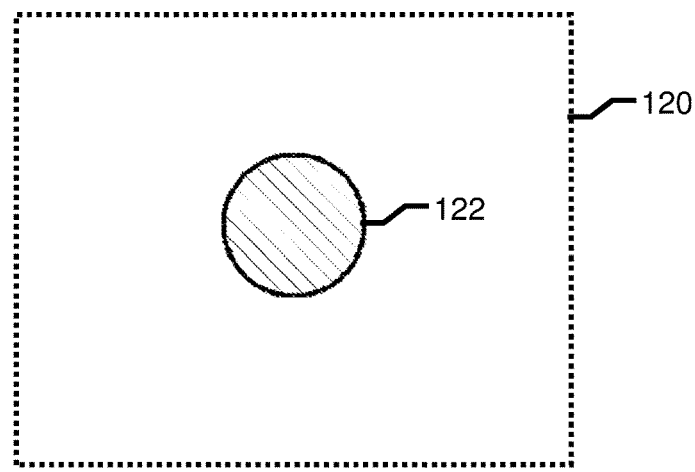
FIG. 5 shows the midground plane of FIG. 1, together with the object that is present in the midground plane.
Figure 6:
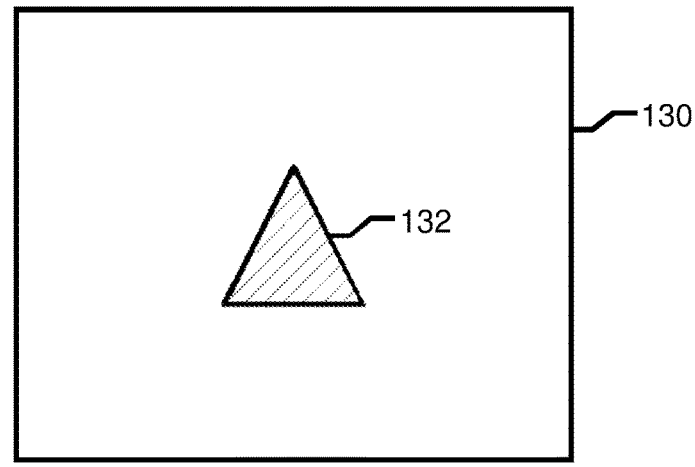
FIG. 6 shows the foreground plane of FIG. 1, together with the object that is present in the foreground plane.

Referring to FIGS. 4 to 6, which show the objects of FIG. 1 separated into background 110, midground 120 and foreground 130 layers respectively. One object appears in each of the layers, each of the objects, for the sake of clarity of explanation, being of a similar size.

Returning to FIG. 3, at step 312, the midground layer 120 is enlarged slightly and the foreground layer 130 is enlarged slightly more.

Figure 7:
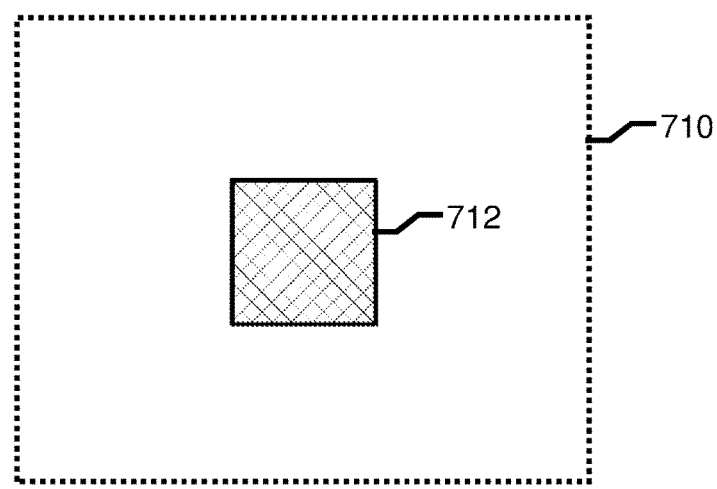
FIG. 7 shows the background plane and object of FIG. 4 unchanged in size.
Figure 8:
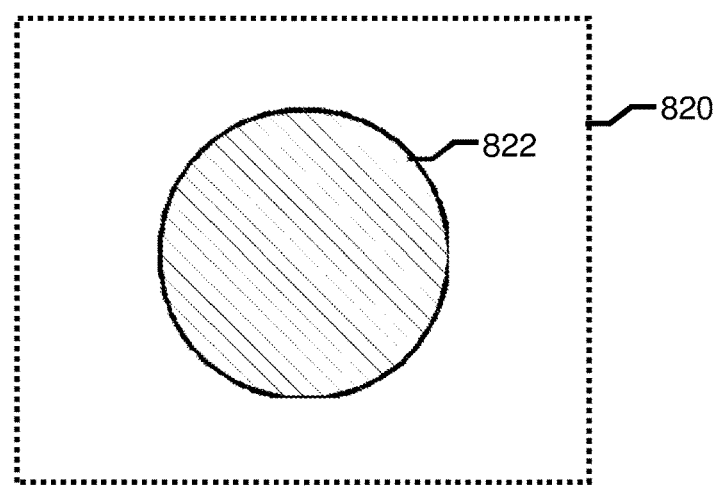
FIG. 8 shows the midground plane and object of FIG. 5 enlarged by a first factor.
Figure 9:
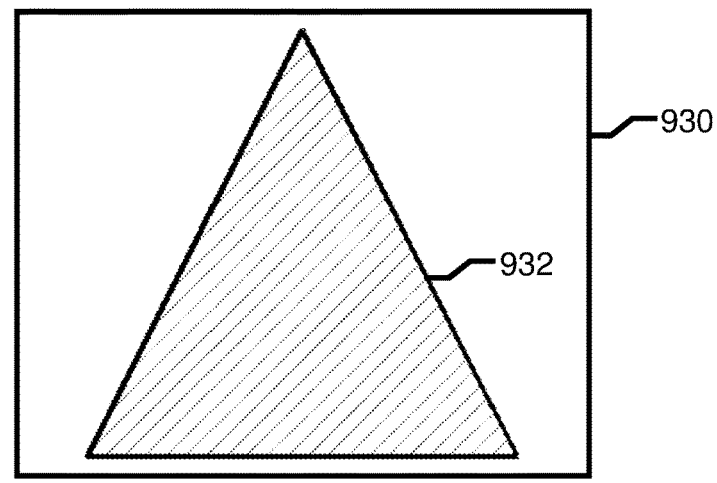
FIG. 9 shows the foreground plane and object of FIG. 6 enlarged by a second factor, the second factor being larger than the first factor.

Referring now to FIGS. 7 to 9, which show the resulting enlarged layers. FIG. 7 shows the background layer 710, which contains object 712 and which, in this example is unchanged from that shown in FIG. 4. FIG. 8 shows the midground layer 820, which contains object 822, which is a slightly enlarged version of the object 122 shown in FIG. 5. In the example of FIG. 8, the object has been roughly doubled in size to make the enlargement clearer, but in practice a smaller enlargement factor would likely be used. FIG. 9 shows the foreground layer 930, which contains object 932, which is a more enlarged version of the object 132 shown in FIG. 6. In the example of FIG. 9, the object has been roughly trebled in size to make the enlargement clearer, but in practice a smaller enlargement factor would likely be used. However, the enlargement factor used for the foreground layer 930 is greater than that used for the midground layer 820.

In an embodiment, instead of the midground layer 120 being enlarged slightly and the foreground layer 130 being enlarged slightly more, the background layer 110 may be shrunk slightly, the midground layer 120 may remain unchanged and the foreground layer 130 may be enlarged slightly. In yet another embodiment, the foreground layer 130 may remain unchanged, the midground layer 120 may be shrunk slightly and the background layer 110 may be shrunk slightly more. It is worthwhile to note that in the present embodiments the relative enlargement or shrinkage of the layers 110, 120, 130, provide the advantage that the layers 110, 120, 130 nearer the observer are larger than those further from the observer.

At step 316, a tiltable image is produced by composing the scaled layers 710, 820, 930 created at step 312. The method ends at step 318.

Figure 10:
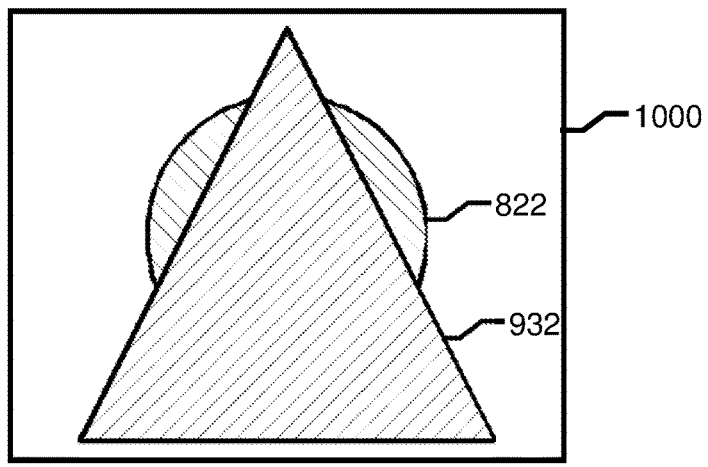
FIG. 10 shows a view from straight ahead of the objects of FIGS. 7, 8 and 9.

FIG. 10 shows the tiltable image 1000 produced at step 312 when viewed from straight ahead, that is with, for example, a mobile device not tilted. Enlarged foreground object 932 obscures much of midground object 822 and all of background object 712. In this image, less of the information about the midground object 822 and the background object 712 may be seen by the observer. Some information that was captured at step 304 of FIG. 3, particularly about midground object 122 and background object 112 is not visible to the observer.

Figure 11:
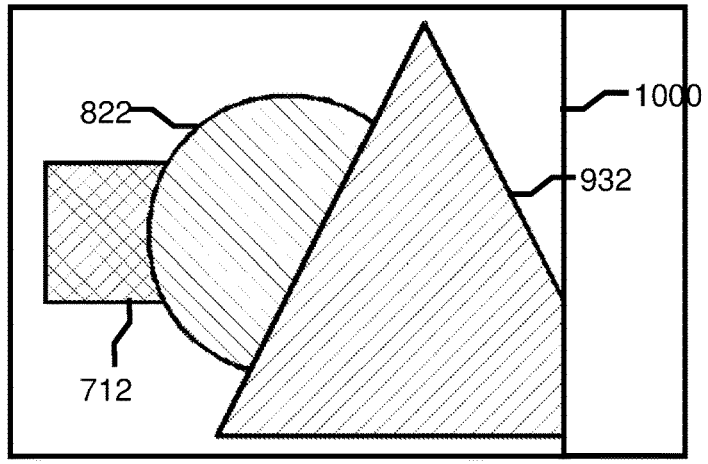
FIG. 11 shows a view, responsive to a device being tilted to the left, of the objects of FIGS. 7, 8 and 9.

FIG. 11 shows the tiltable image 1000 produced at step 312 when viewed from the left side, that is with, for example, a mobile device tilted to the left so as to provide the observer with the impression of having moved to the left to view what is behind the foreground object 932. In FIG. 11, the foreground object 932 appears to have moved to the right, thus revealing more of the midground object 822 and the background object 712 appears to have moved to the left, thus emerging from behind midground object 822. The moving of the plurality of layers relative to each other displays the occluded information by moving a layer closer to a viewer towards a lower side of the tilt and moving a layer further from a viewer towards an upper side of the tilt.

Some of the previously non-visible information that was captured at step 304 of FIG. 3, particularly about midground object 122 and background object 112 is made visible to the observer. In the view of FIG. 10, this information was hidden behind the foreground object and was not made visible to the observer. The enlargement of layers closer to the observer allows the information that was captured but not displayed when viewed from straight ahead to be used to fill in the areas of the image which are revealed when the mobile device is tilted to give the impression of moving to the left or to the right. This information is "real" information about the midground 122 and background 112 objects, thus improving the realism and providing individual pixels that are lit with respect to the original scene lighting angles. It also reduces the computation necessary to create the information required to fill in the revealed areas of the image.

Figure 12:
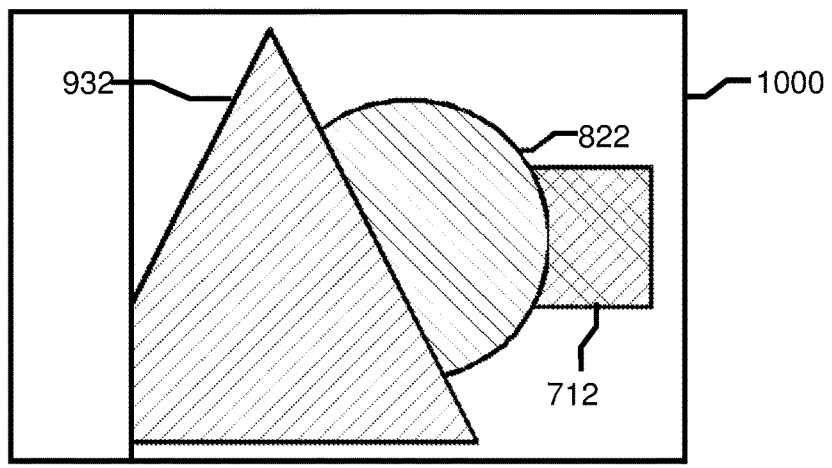
FIG. 12 shows a view, responsive to a device being tilted to the right, of the objects of FIGS. 7, 8 and 9.

FIG. 12 shows the tiltable image 1000 produced at step 312 when viewed from the right side, that is with, for example, a mobile device tilted to the right so as to provide the observer with the impression of having moved to the right to view what is behind the foreground object 932. In FIG. 11, the foreground object 932 appears to have moved to the left, thus revealing more of the midground object 822 and the background object 712 appears to have moved to the right, thus emerging from behind midground object 822.

In an embodiment, the layer containing the foreground object 932 stays in the same position, with the layer containing the background object 712 moving further than the layer containing the midground object 822. In another embodiment, the layer containing the background object 712 stays in the same position, with the layer containing the foreground object 932 moving further than the layer containing the midground object 822.

As mentioned above, embodiments of the disclosure are not limited to having three planes. If more than three planes are used, then the shifting of each of the planes is done according to how far from the foreground or background each plane is.

Figure 13:
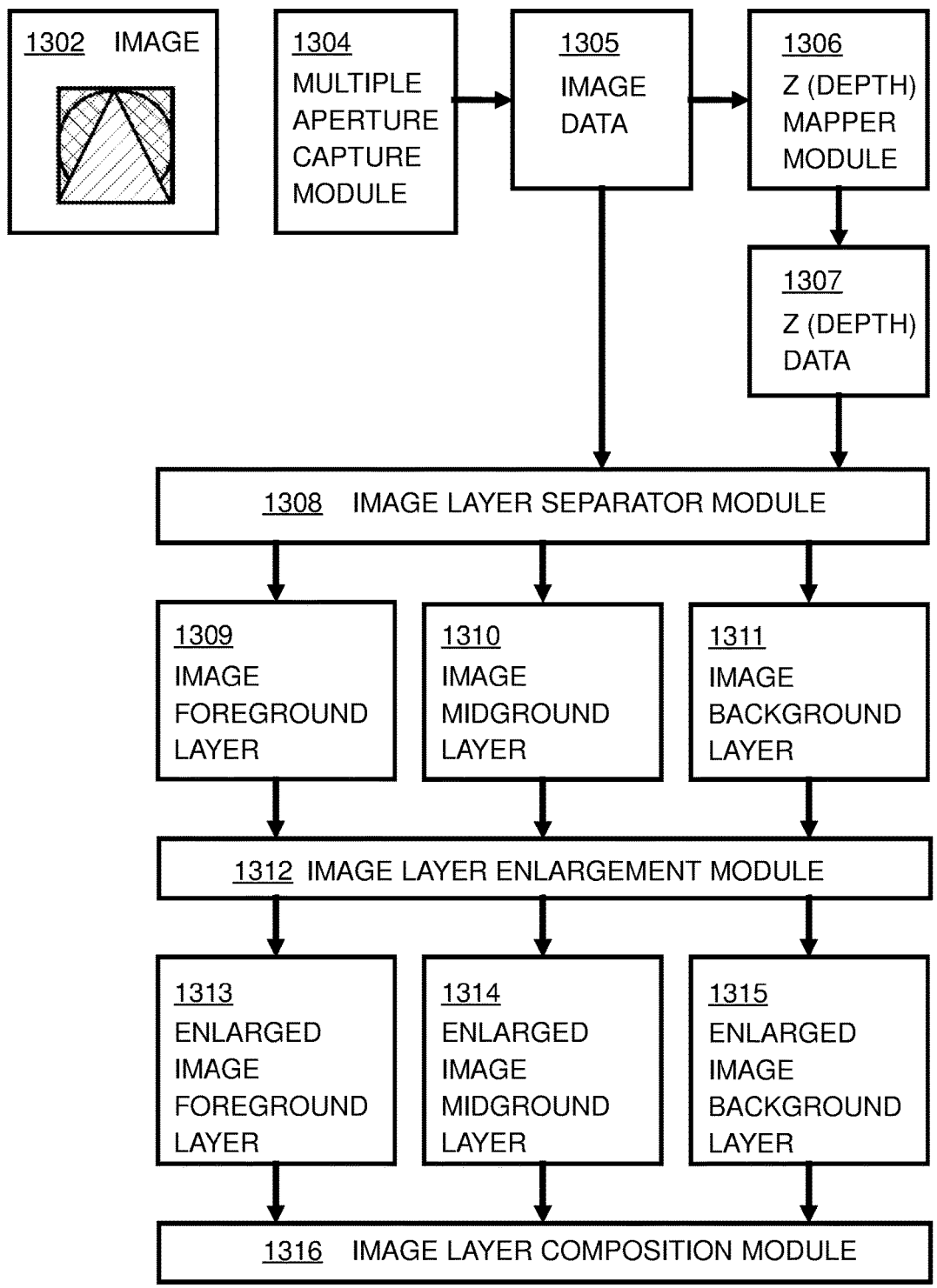
FIG. 13 is a block diagram of a system according to an embodiment of the present disclosure of creating an artificially tiltable image display from an image containing Z distance information.

FIG. 13 is a block diagram of a system according to an embodiment of the present disclosure of creating an artificially tiltable image display from an image containing Z distance information. Multiple aperture image capture module 1304 produces image data 1305 from image 1302. Image data 1305 comprises data from each of the multiple apertures of the multiple aperture image capture module 1304. In an embodiment, multiple aperture image capture 1304 module may comprise two image apertures and associated sensors which are spaced apart. The spacing apart of these multiple apertures may be by any amount, but typically is a few centimeters. More than two apertures may be used and spacing other than a few centimeters may be used. Z (depth) mapper module 1306 maps Z, or depth, data 1307 onto the image. Because the images captured by each of the multiple apertures are taken from slightly different positions, it is possible, using parallax, to obtain a distance of an object from the aperture. For example, an object which is in a background plane 110 will be seen by image sensors associated with each of the apertures as being located in substantially the same position. Similarly, an object which is in a foreground plane 130 will be seen by image sensors associated with each of the apertures as being located in a different position when viewed from each of the apertures. Further, objects in a midground plane 120 will be seen by the image sensors associated with each of the apertures as being located in a position that is somewhere between the foreground and background objects. This difference in perceived position between the views from each aperture may be used to determine the Z (or depth) position of each portion in an image, with each portion typically being an object. Such mapping is well known to persons skilled in the art.

Image layer separator module 1308 separates the captured image 1305 into layers 1309-1311 according to the mapped Z value 1307 associated with each portion of the image 1305. In embodiments of the disclosure, the captured image 1306 is separated into layers 1309-1311, with each layer 1309-1311 containing portions of the image 1305 associated with objects have a range of Z values. For example, an image foreground layer 1309 may contain portions of the image associated with objects at a distance of less than 10 arbitrary units from the apertures. Similarly, an image midground layer 1310 may contains portions of the image 1305 associated with objects at a distance of 10 to 30 arbitrary units from the apertures. Further, an image background layer 1311 may contains portions of the image 1305 associated with objects at a distance of more than 30 arbitrary units from the apertures. These distances are provided as examples only and embodiments of the present disclosure may implement any combination of distances, provided that foreground layer objects are closer to the aperture than background layer objects.

In another embodiment of the disclosure, the captured image 1305 is separated into layers 1309-1311, with each layer 1309-1311 containing portions of the image 1305 associated with objects have a particular Z value. An image midground layer 1310 may contain portions of the image 1305 associated with objects at a distance of 20 arbitrary units only, with an image foreground layer 1309 containing portions of the image 1305 associated with objects at a distance of less than 20 arbitrary units only and an image background layer 1311 containing portions of the image 1305 associated with objects at a distance of more than 20 arbitrary units only. Further, as described above, any number of layers 1309-1311 may be used in embodiments of the disclosures, three layers 1309-1311 being described here for clarity of description. Each layer 1309-1311 may be associated with any size of range of Z values.

In an embodiment, the range of Z values associated with one of the layers 1309-1311 may be adjusted to avoid splitting an object between layers 1309-1311. This is achieved by identifying adjacent areas of the screen, determined by identifying areas that have adjacent X and Y values, which also have adjacent Z values, but which would be in different layers 1309-1311. These identified areas are then placed into the same Z layer 1309-1311. A simplified example will now be described using just two pixels. For example, an area of an image has a pixel at an X co-ordinate of 50 and a Y co-ordinate of 50 which has a mapped Z value of 11 arbitrary units. Using the ranges described above, this area of the image forms part of the midground. Another area of an image has a pixel at an X co-ordinate of 51 and a Y co-ordinate of 51 and has a mapped Z value of 9. Using the ranges described above, this area of the image forms part of the foreground. But, the two pixels are adjacent to each other and the Z values are similar, although falling into separate layers. It is most likely that these two pixels of the image are associated with the same object. So the range of pixels associated with, for example, the midground layer, may be adjusted to be from 9 to 30 arbitrary units, whilst the range associated with the foreground layer is adjusted to be from 0 to 8 arbitrary units.

In another embodiment, instead of adjusting the ranges associated with each of the layers 1309-1311 as described above, particular areas of the image may be assigned to, for example, an image midground layer 1310, based on the Z values of adjacent pixels indicating that the particular areas of the image 1305, although having different, but similar Z values, are part of the same object. In the example above, the range of pixels associated with, for example, the image midground layer 1310, may remain at 10 to 30 arbitrary units and the range associated with the foreground 1309 layer may remain at 0 to 10 arbitrary units, but the pixel having an X co-ordinate of 51 and a Y co-ordinate of 51 and a mapped Z value of 9 is nevertheless placed in the midground layer 1310, thus keeping the entirety of an object in the same layer 1309-1311.

Image layer enlargement module 1312 enlarges the image midground layer 1310 slightly and the image foreground layer 1309 slightly more to create enlarged image midground layer 1314 and enlarged image foreground layer 1313. In an embodiment, enlarged image background layer 1315 is the same data as image background layer 1311. In an embodiment, instead of the image midground layer 1310 being enlarged slightly and the image foreground layer 1309 being enlarged slightly more, the image background layer 1311 may be shrunk slightly, the image midground layer 1310 may remain unchanged and the image foreground layer 1309 may be enlarged slightly. In yet another embodiment, the image foreground layer 1309 may remain unchanged, the image midground layer 1310 may be shrunk slightly and the image background layer 1311 may be shrunk slightly more. It is worthwhile to note that in the present embodiments the relative enlargement or shrinkage of the layers 1309-1311, provides advantages in that layers 1309-1311 that are nearer the observer are larger than those further from the observer.

Image layer composition module 1316 produces a tiltable image by composing the enlarged image layers 1313-1315 created by the image layer enlargement module 1312.

Figure 14:
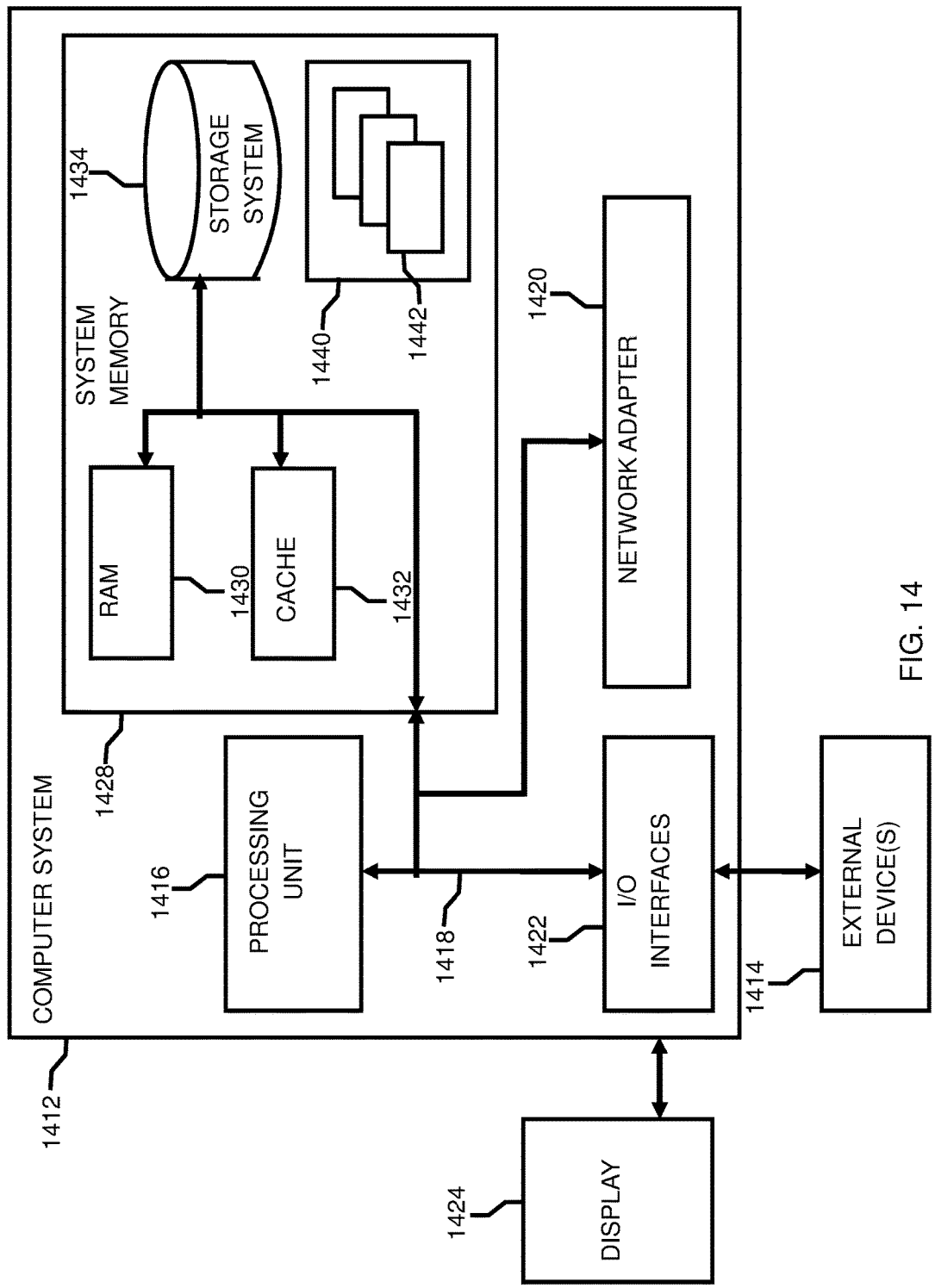
FIG. 14 depicts a computer system in which embodiments of the present disclosure may be implemented.

Referring now to FIG. 14, a schematic of an example of computing system is shown. Computing system 1412 is only one example of a suitable computing system and is not intended to suggest any limitation as to the scope of use or functionality of embodiments of the disclosure described herein. Regardless, computing system 1412 is capable of being implemented and/or performing any of the functionality set forth hereinabove.

Computer system/server 1412 is operational with numerous other general purpose or special purpose computing system environments or configurations. Examples of well-known computing systems, environments, and/or configurations that may be suitable for use with computer system/server 1412 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1412 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 1412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 14, computer system/server 1412 is shown in the form of a general-purpose computing device. The components of computer system/server 1412 may include, but are not limited to, one or more processors or processing units 1416, a system memory 1428, and a bus 1418 that couples various system components including system memory 1428 to processor 1416.

Bus 1418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 1412 typically includes a variety of computer system readable media. Such media may be any available media that is accessible by computer system/server 1412, and it includes both volatile and non-volatile media, removable and non-removable media.

System memory 1428 can include computer system readable media in the form of volatile memory, such as random access memory (RAM) 1430 and/or cache memory 1432. Computer system/server 1412 may further include other removable/non-removable, volatile/non-volatile computer system storage media. By way of example only, storage system 1434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1418 by one or more data media interfaces. As will be further depicted and described below, memory 1428 may include at least one program product having a set (e.g., at least one) of program modules that are configured to carry out the functions of embodiments of the disclosure.

Program/utility 1440, having a set (at least one) of program modules 1442, may be stored in memory 1428 by way of example, and not limitation, as well as an operating system, one or more application programs, other program modules, and program data. Each of the operating system, one or more application programs, other program modules, and program data or some combination thereof, may include an implementation of a networking environment. Program modules 1442 generally carry out the functions and/or methodologies of embodiments of the disclosure as described herein.

Computer system/server 1412 may also communicate with one or more external devices 1414 such as a keyboard, a pointing device, a display 1424, etc.; one or more devices that enable a user to interact with computer system/server 1412; and/or any devices (e.g., network card, modem, etc.) that enable computer system/server 1412 to communicate with one or more other computing devices. Such communication can occur via Input/Output (I/O) interfaces 1422. Still yet, computer system/server 1412 can communicate with one or more networks such as a local area network (LAN), a general wide area network (WAN), and/or a public network (e.g., the Internet) via network adapter 1420. As depicted, network adapter 1420 communicates with the other components of computer system/server 1412 via bus 1418. It should be understood that although not shown, other hardware and/or software components could be used in conjunction with computer system/server 1412. Examples, include, but are not limited to: microcode, device drivers, redundant processing units, external disk drive arrays, RAID systems, tape drives, and data archival storage systems, etc.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, column-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method of creating an artificially tiltable image display from an image containing Z distance values, the method comprising:
    separating the image into a plurality of layers using the Z distance values;
    expanding the plurality of layers by a factor dependent on the Z distance values, a layer closer to a viewer being enlarged by a larger factor than a layer further from a viewer, to create information in the layer further from a viewer that is occluded by the layer closer to a viewer; and
    responsive to a request to tilt the image display, moving the plurality of layers relative to each other so as to display the occluded information.

2. The computer-implemented method of claim 1, wherein the image containing Z distance values is provided by a mobile device having multiple apertures.

3. The computer-implemented method of claim 1, wherein the image is separated into a plurality of layers by assigning to each one of the plurality of layers portions of the image associated with objects in the image having a range of Z distance values associated with each one of the plurality of layers.

4. The computer-implemented method of claim 3, wherein the range of Z distance values associated with each one of the plurality of layers is adjusted so as to ensure that portions of the image associated with an object in the image are assigned to the same layer.

5. The computer-implemented method of claim 3, wherein adjacent portions of the image that have adjacent Z distance values are assigned to the same one of the plurality of layers.

6. The computer-implemented method of claim 1, wherein the image is separated into two layers using the Z distance values, portions of the image associated with people being placed in a midground layer and portions of the image other than those associated with people being placed in a background layer.

7. The computer-implemented method of claim 1, wherein the moving the plurality of layers relative to each other so as to display the occluded information comprises moving a layer closer to a viewer towards a lower side of the tilt and moving a layer further from a viewer towards an upper side of the tilt.

8. Apparatus for creating an artificially tiltable image display from an image containing Z distance values, the apparatus comprising:
    an image layer separator module for separating the image into a plurality of layers using the Z distance values;
    an image layer enlargement module for expanding the plurality of layers by a factor dependent on the Z distance values, a layer closer to a viewer being enlarged by a larger factor than a layer further from a viewer, to create information in the layer further from a viewer that is occluded by the layer closer to a viewer; and an image layer composition module which, responsive to a request to tilt the image display, moves the plurality of layers relative to each other so as to display the occluded information.

9. The apparatus of claim 8, wherein the image containing Z distance values is provided by a mobile device having multiple apertures.

10. The apparatus of claim 8, wherein the image layer separator assigns to each one of the plurality of layers, portions of the image associated with objects in the image having a range of Z distance values associated with each one of the plurality of layers.

11. The apparatus of claim 10, wherein the image layer separator module adjusts the range of Z distance values associated with each one of the plurality of layers so as to ensure that portions of the image associated with an object in the image are assigned to the same layer.

12. The apparatus of claim 10, wherein the image layer separator module assigns adjacent portions of the image that have adjacent Z distance values to the same one of the plurality of layers.

13. The apparatus of claim 8, wherein the image layer separator module separates the image into two layers using the Z distance values, portions of the image associated with people being placed in a midground layer and portions of the image other than those associated with people being placed in a background layer.

14. A computer program product for creating an artificially tiltable image display from an image containing Z distance values, the computer program product comprising:

a computer readable storage medium having program instructions embodied therewith, the program instructions executable by a computer to cause the computer to:

separate the image into a plurality of layers using the Z distance values;

expand the plurality of layers by a factor dependent on the Z distance values, a layer closer to a viewer being enlarged by a larger factor than a layer further from a viewer, to create information in the layer further from a viewer that is occluded by the layer closer to a viewer; and responsive to a request to tilt the image display, move the plurality of layers relative to each other so as to display the occluded information.

15. The computer program product of claim 14, wherein the image containing Z distance values is provided by a mobile device having multiple apertures.

16. The computer program product of claim 14, wherein the image is separated into a plurality of layers by assigning to each one of the plurality of layers portions of the image associated with objects in the image having a range of Z distance values associated with each one of the plurality of layers.

17. The computer program product of claim 16, wherein the range of Z distance values associated with each one of the plurality of layers is adjusted so as to ensure that portions of the image associated with an object in the image are assigned to the same layer.

18. The computer program product of claim 16, wherein adjacent portions of the image that have adjacent Z distance values are assigned to the same one of the plurality of layers.

19. The computer program product of claim 14, wherein the image is separated into two layers using the Z distance values, portions of the image associated with people being placed in a midground layer and portions of the image other than those associated with people being placed in a background layer.

20. The computer program product of claim 14, wherein the moving the plurality of layers relative to each other so as to display the occluded information comprises moving a layer closer to a viewer towards a lower side of the tilt and moving a layer further from a viewer towards an upper side of the tilt.

* * * * *